(12) United States Patent
Rouhana

(10) Patent No.: US 9,308,890 B2
(45) Date of Patent: Apr. 12, 2016

(54) REVERSIBLE 3-POINT TO 4-POINT SEAT BELT SYSTEM

(71) Applicant: Ford Global Technologies, LLC, Dearborn, MI (US)

(72) Inventor: Stephen William Rouhana, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/072,453

(22) Filed: Nov. 5, 2013

(65) Prior Publication Data

US 2014/0138942 A1    May 22, 2014

Related U.S. Application Data

(63) Continuation-in-part of application No. 13/654,504, filed on Oct. 18, 2012, now abandoned.

(51) Int. Cl.
*B60R 22/00* (2006.01)
*B60R 22/347* (2006.01)
*B60R 22/02* (2006.01)
*B60R 21/01* (2006.01)

(52) U.S. Cl.
CPC .............. *B60R 22/347* (2013.01); *B60R 22/02* (2013.01); *B60R 2021/01279* (2013.01); *B60R 2022/027* (2013.01)

(58) Field of Classification Search
CPC ...... B60R 22/20; B60R 22/023; B60R 22/00; B60R 2021/01279; B60R 2022/027
USPC .......... 297/484, 483, 474, 468; 280/807, 808, 280/801.1; 244/122 R, 122 B
See application file for complete search history.

(56) References Cited

U.S. PATENT DOCUMENTS 6,293,588 B1 *  9/2001  Clune .......................... 280/808
6,811,186 B1 * 11/2004  Fraley et al. ............... 280/801.2

* cited by examiner

*Primary Examiner* — Keith Frisby
(74) *Attorney, Agent, or Firm* — LeClairRyan

(57) ABSTRACT

A seat belt system for a vehicle that is reversible between a 3-point arrangement and a 4-point arrangement is provided. The seat and seat belt arrangement includes a seat having a centerline, a seat back and a seat base. The seat and seat belt arrangement further includes a pair of shoulder belts, a pair of moveable shoulder belt guides and associated moveable retractors. A pair of lap belts is also provided. A buckle assembly is also provided to which the shoulder belts and lap belts are attached. Lap belt retractors are provided. One of the retractors is selectively movable between a retracted position in which the buckle assembly is to one side of the centerline and non-retracted position in which the buckle assembly is generally on the centerline. In the retracted position the moveable guides are moved away from the centerline while in the non-retracted position the moveable guides are moved toward the centerline.

14 Claims, 7 Drawing Sheets

REVERSIBLE 3-POINT TO 4-POINT SEAT BELT SYSTEM

CROSS-REFERENCE TO RELATED APPLICATIONS

This application is a continuation-in-part of U.S. Ser. No. 13/654,504 (filed Oct. 18, 2012), which is hereby incorporated by reference in its entirety. The benefit of U.S. Ser. No. 13/654,504 is claimed.

TECHNICAL FIELD

The disclosed invention relates generally to seat belts for vehicle seats. More particularly, the disclosed invention relates to a seat belt system for a vehicle that is reversible between a 3-point arrangement and a 4-point arrangement.

BACKGROUND OF THE INVENTION

Automotive vehicles incorporate a variety of restraint systems to provide for the safety of vehicle occupants. For example, it is known in the vehicle art to provide various types of seat belts or restraint systems for restraining an occupant in his or her seat and providing controlled deceleration of portions of the body to limit the forces applied to the occupant's body during rapid deceleration of a vehicle from a cause such as a collision. Various types of seat belts and restraint systems have been used in automobiles, trucks, and other vehicles and are commonly known today.

Known seat belt systems typically used in commercially available production vehicles are three-point restraint systems with a lap belt and a shoulder belt extending over one shoulder of the occupant and connecting with the lap belt. The lap belts are anchored at one end to the seat or to the vehicle adjacent the seat. The shoulder belts are connected at one end to the vehicle or to the seat and at the other end to the lap belt or lap belt buckle mechanism.

Four, five, and six-point restraint systems are among some of the seat belt and restraint systems that are particularly utilized in off-road type vehicles and other sport-type vehicles in order to provide additional restraint for occupants over two and three-point restraint systems. These seat belt systems tend to have multiple adjustable cinching mechanisms and are awkward and difficult to operate and properly position on an occupant. They also may be less comfortable and more complex due to the multiple mechanisms and therefore not amenable to quick donning and doffing on multiple occasions as may be required in a passenger vehicle.

Of particular interest to the automotive industry today is the 4-point seat belt restraint system. Studies indicated that the use of 4-point belts may help reduce chest injuries especially in elderly occupants of motor vehicles. However, there are concerns that some occupants may not like the 4-point seat belt restraints and therefore may elect to be unrestrained rather than wear a 4-point seat belt. This would expose occupants to potentially much higher risk of injury in a crash than if they were restrained. Customers may be provided with an option to choose between a 3-point seat belt arrangement and a 4-point seat belt arrangement, for those who do not like 4-point seat belts, could resolve this issue.

In addition, early research with specialized crash test dummies which simulate a pregnant woman in her third trimester showed higher intrauterine pressure when a 4-point belt was used when compared with a 3-point belt. While it is unknown whether the pressure was high enough to cause injury to a baby in the womb, it was considered desirable to have a retrofit kit for pregnant women to get the buckle of the 4-point belt off of the abdomen.

Research has further shown that 4-point belts are fundamentally different from 3-point belts in the way the body loads them in a crash. Accordingly, any system that provides for selection between a 3-point seat belt system and a 4-point seat belt system would require a method of altering the geometry, lap belt mobility, and shoulder belt load limit of a 4-point belt system to allow its safe use as a 3-point belt. Thus in any reversible system the 4-point belt arrangement would require two shoulder belts which are closer to the centerline of the seat than a 3-point belt and may require a different load limit in each configuration.

Accordingly, a need exists today for a seat belt arrangement that is reversible between a 3-point arrangement and a 4-point arrangement. Such a system must be comfortable to the wearer and would thus be able to have an altered belt geometry. Accordingly, the ideal system would not only allow reversibility between the 3-point belt arrangement and the 4-point belt arrangement but would also be comfortable to the user in either configuration. Additionally, the properties of the system components would be adjustable and adaptable to the arrangement selected, whether that is a 3-point or a 4-point arrangement.

SUMMARY OF THE INVENTION

The disclosed invention overcomes several of the problems of the prior art by providing a seat belt system for a vehicle that is easily reversible between a 3-point arrangement and a 4-point arrangement. The seat and seat belt arrangement of the disclosed invention includes a vehicle seat having a seat back and a seat base. The vehicle seat includes a centerline.

The seat and seat belt arrangement further includes a pair of shoulder belts and a pair of lap belts. The pair of shoulder belts includes a first shoulder belt having a first end and a second shoulder belt having a first end. In one embodiment of the disclosed invention the first ends of the first and second shoulder belts are adjustably attached to the seat back. In this embodiment a first moveable shoulder belt guide is movably attached to the upper portion of the seat back through which the first shoulder belt passes. A second moveable shoulder belt guide is movably attached to the upper portion of the seat back through which the second shoulder belt passes.

In another embodiment of the disclosed invention both the shoulder belt guides and the shoulder belt retractors are movably attached to the seat back.

In yet another embodiment of the disclosed invention the first ends of the first and second shoulder belts are attached to the vehicle body structure. In this embodiment the anchoring points are movable. The pair of lap belts includes a first lap belt having a first end and a second end and a second lap belt having a first end and a second end.

The seat and seat belt arrangement of the disclosed invention also includes a buckle assembly. The buckle assembly includes a lap belt buckle to which the second end of the first lap belt and the second end of the first shoulder belt are attached and a latchplate to which the second end of the second lap belt and the second end of the second shoulder belt are attached. The lap belt buckle is releasably attachable to the latchplate.

The arrangement of the disclosed invention further includes a first retractor and a second retractor. The first end of the first lap belt is attached to the first retractor. The first end of the second lap belt is attached to the second retractor. Alternatively, the first ends of the lap belts may be attached to a single retractor.

The first retractor is selectively movable between a retracted position in which the buckle assembly is to one side of the centerline and non-retracted position in which the buckle assembly is generally free to move toward or away from the centerline except in an impact event. The first retractor includes a lock for locking the first retractor in the retracted position. The lock can be of any of several configurations but may comprise a latch and a ratchet and may alternatively be an electro-mechanical lock.

In use, if the occupant prefers a 4-point arrangement the first retractor is in its non-retracted position whereby the buckle assembly is generally free to move toward or away from the centerline of the seat and the moveable shoulder belt guides are moved inboard relative to the centerline. If, alternatively, the occupant prefers a 3-point arrangement the first retractor is locked into its retracted position whereby the buckle assembly is positioned to one side of the seat's centerline to a position adjacent the first retractor and the moveable shoulder belt guides are moved outward relative to the centerline.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
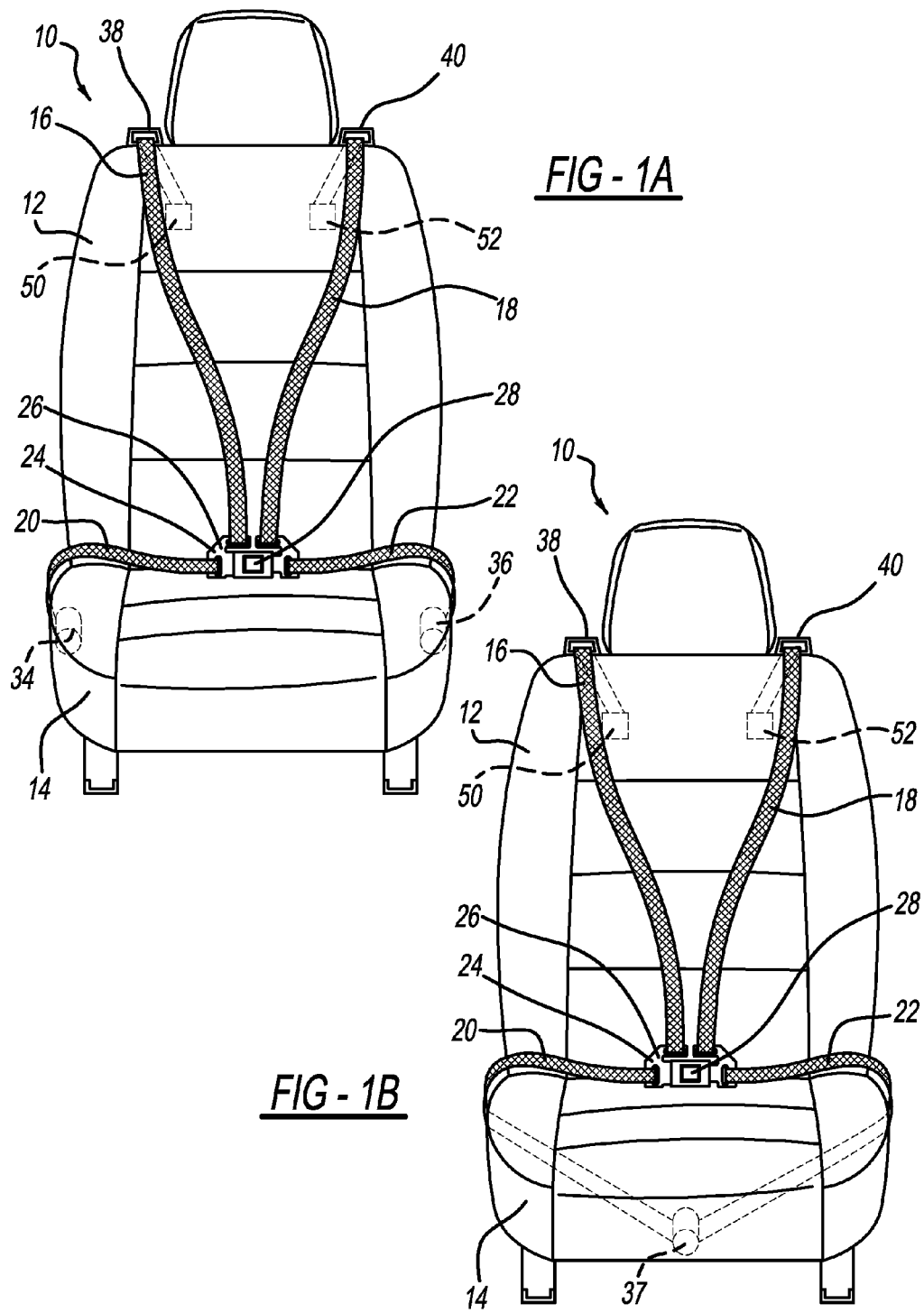
FIG. 1A is a front view of a vehicle seat having the reversible 3-point to 4-point seat belt system according to a first embodiment of the disclosed invention illustrating the belt arrangement in its 4-point configuration illustrating two seat base retractors.
FIG. 1B is a front view of an alternative embodiment of the vehicle seat of the disclosed invention similar to that of FIG. 1A but illustrating a single seat base retractor.

In the following figures, the same reference numerals will be used to refer to the same components. In the following description, various operating parameters and components are described for different constructed embodiments. These specific parameters and components are included as examples and are not meant to be limiting.

Figure 2:
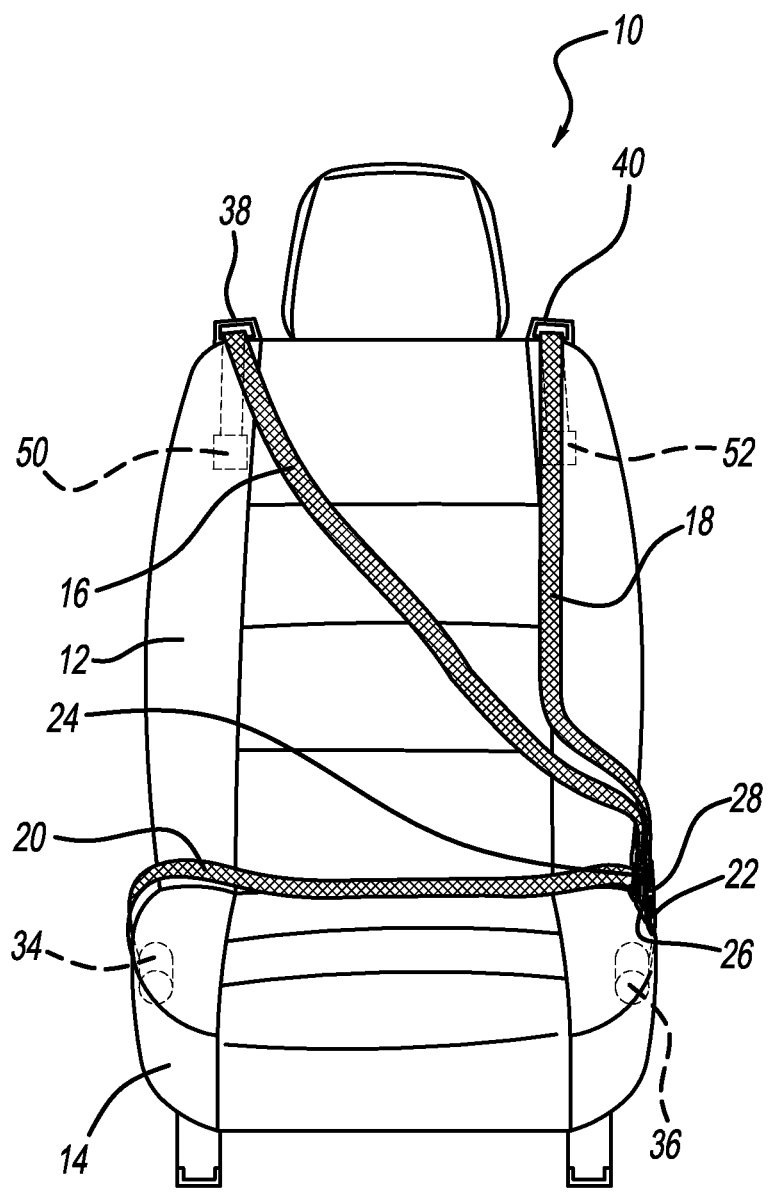
FIG. 2 is a front view of the vehicle seat having the reversible 3-point to 4-point seat belt system according to the first embodiment of the disclosed invention illustrating the belt arrangement in its 3-point configuration.
Figure 3:
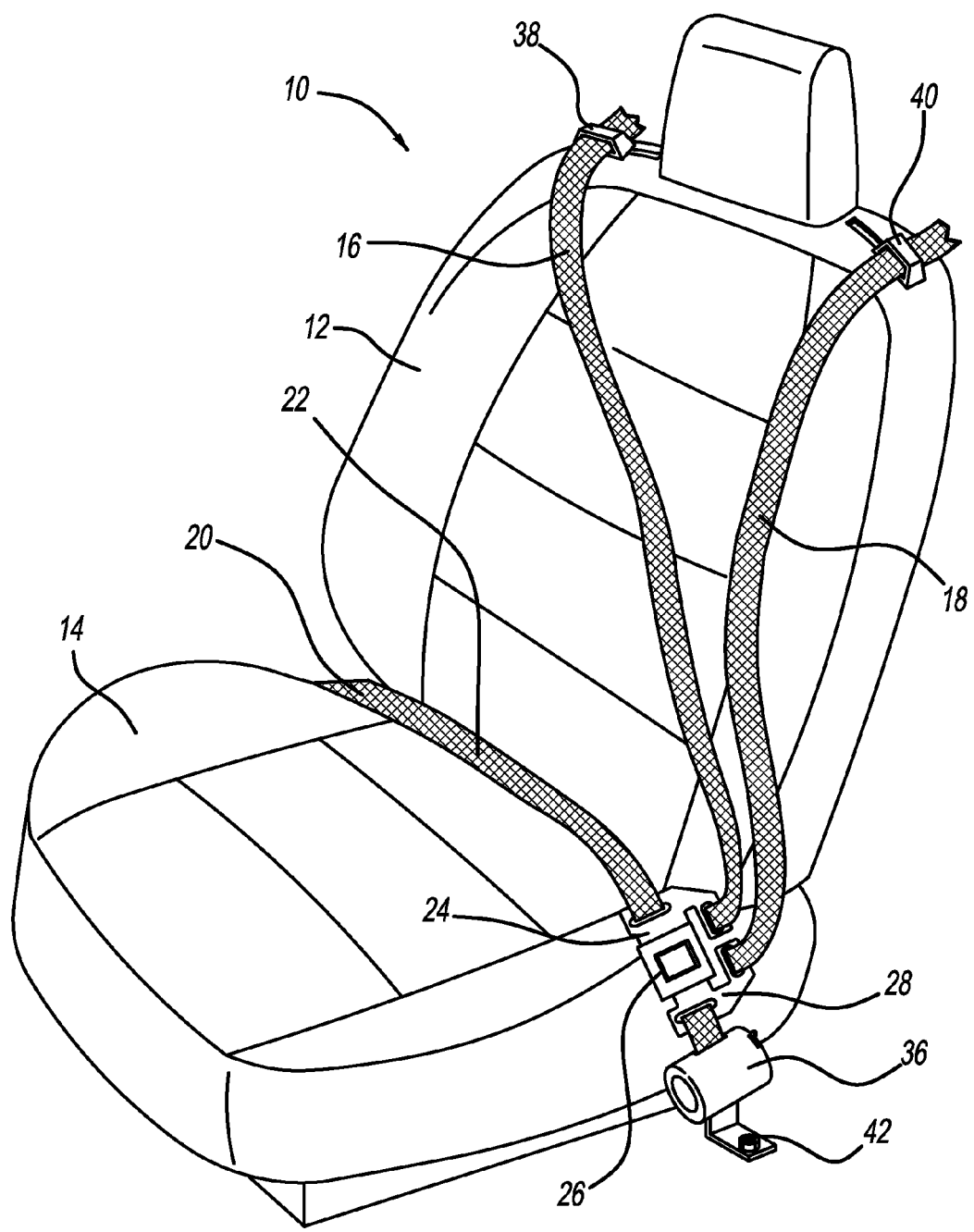
FIGS. 3 and 3A are a perspective view of the vehicle seat having the reversible 3-point to 4-point seat belt system according to first embodiment of the disclosed invention illustrating the belt arrangement in its 3-point configuration and showing the lockable retractor and FIG. 3A illustrates a seated occupant.
Figure 4:
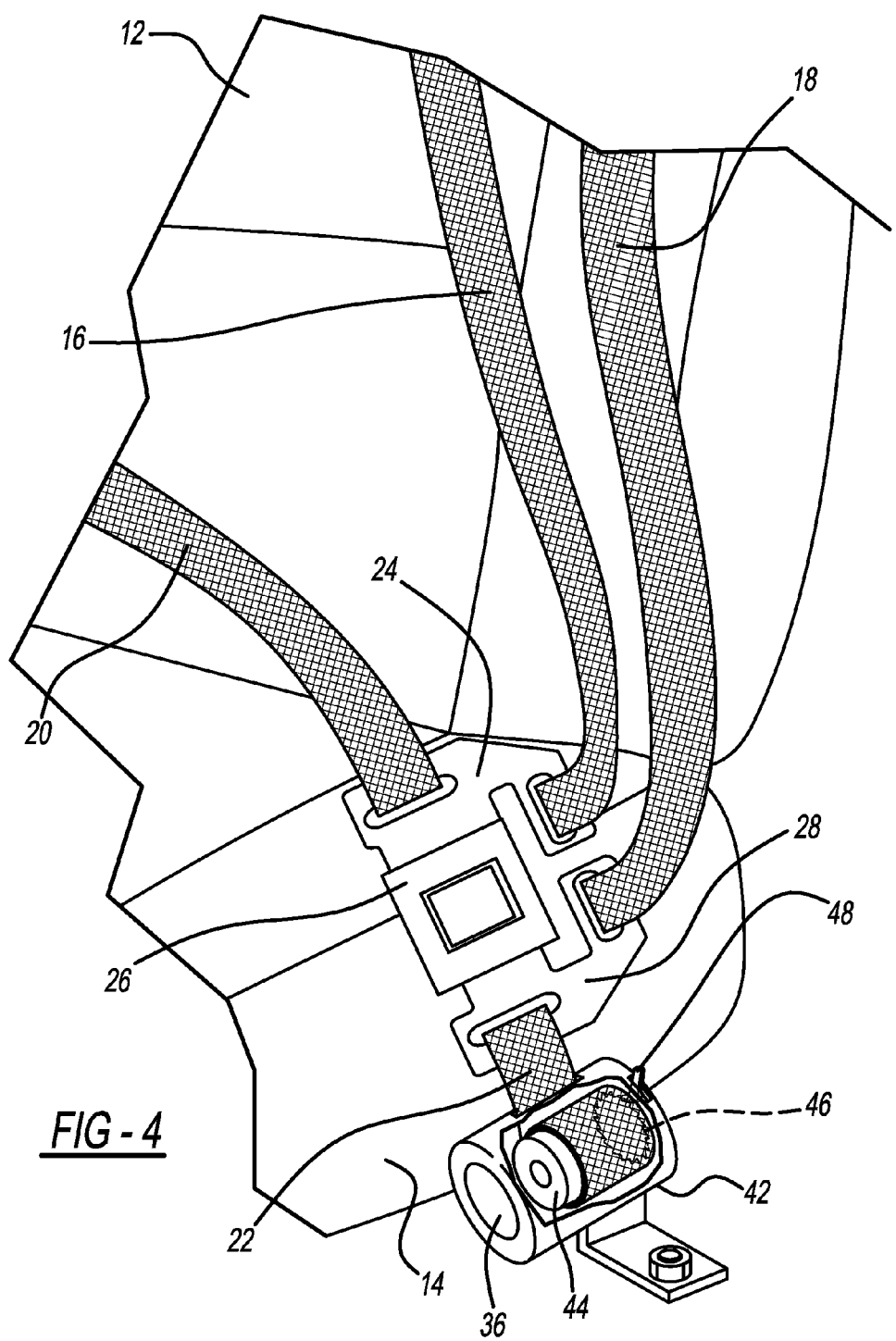
FIG. 4 is a close-up view of the lockable retractor shown in FIG. 3 shown in partial sectional view.
Figure 5:
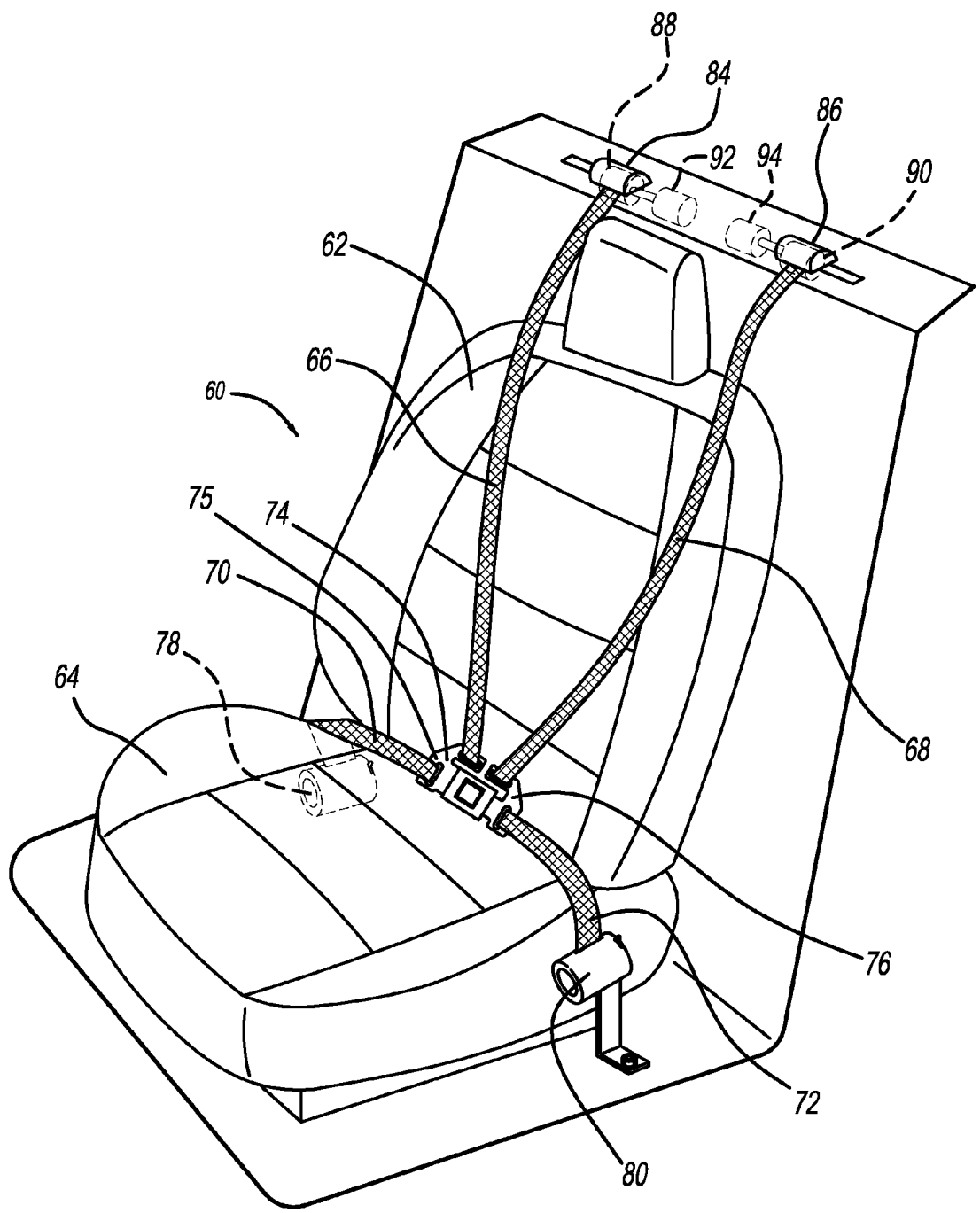
FIG. 5 is a perspective view of a vehicle seat having the reversible 3-point to 4-point seat belt system according to a second embodiment of the disclosed invention illustrating the belt arrangement in its 4-point configuration.
Figure 6:
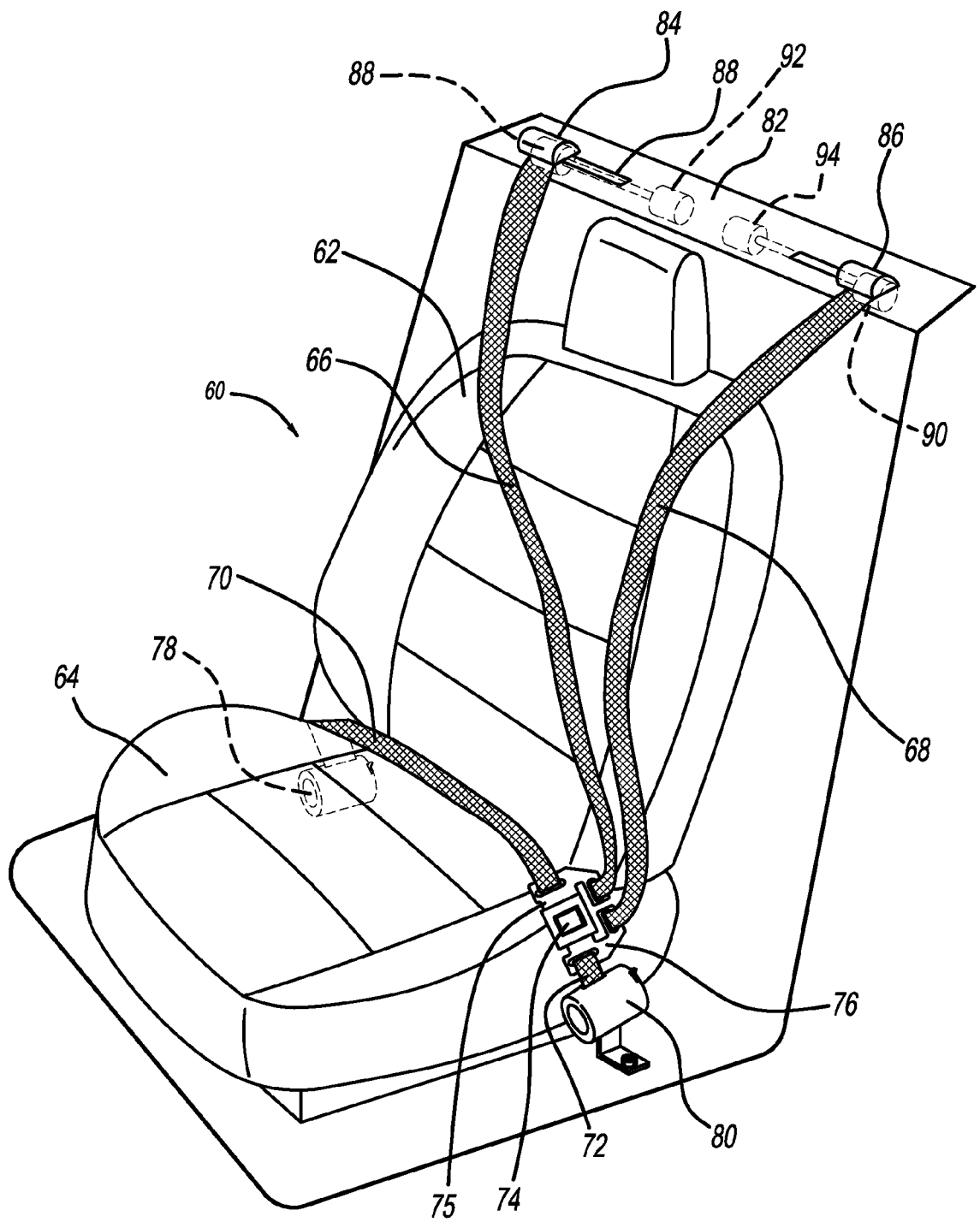
FIG. 6 is a perspective view of the vehicle seat having the reversible 3-point to 4-point seat belt system according to the second embodiment of the disclosed invention illustrating the belt arrangement in its 3-point configuration.

FIGS. 1A, 1B, 2 and 3 relate to the first embodiment of the disclosed invention. FIGS. 5 and 6 relate to the second embodiment of the disclosed invention. FIG. 4 is generic to both embodiments. In general, the disclosed invention provides a workable 3-point seat-integrated restraint system and a workable 4-point seat-integrated restraint system in one package. With respect to FIG. 1A, a vehicle seat, generally illustrated as 10 and having the reversible 3-point to 4-point seat belt system of the disclosed invention is illustrated. The vehicle seat 10 includes a seat back 12 and a seat base 14. The configuration of the vehicle seat 10 and the seat back 12 and the seat base 14 are for illustrative purposes only and are not intended as being limiting.

The vehicle seat 10 is shown in FIGS. 1A and 1B in its 4-point configuration. The vehicle seat 10 provides 4-point seat belts and allows alteration of the belt geometry, lap belt mobility, and shoulder belt load limits. The 4-point belt system includes a first shoulder belt 16, a second shoulder belt 18, a first lap belt 20, and a second lap belt 22.

The vehicle seat 10 according to the disclosed invention also includes a buckle assembly 24. The buckle assembly 24 includes a lap belt buckle 26 to which the first shoulder belt 16 and the first lap belt 20 are attached. The buckle assembly 24 also includes a latchplate 28 to which the second shoulder belt 18 and the second lap belt 22 are attached. It is to be understood that the configurations of the belts 16, 18, 20 and 22, the lap belt buckle 26 and the latchplate 28 are set forth for illustrative purposes only and are intended as being suggestive and not limiting.

The vehicle seat 10 according to the disclosed invention also includes an arrangement for attaching the belts to the seat or to a location adjacent the seat. Particularly, the first shoulder belt 16 and the second shoulder belt 18 are attached to the seat back 12 in a manner known in the art. For example, the first shoulder belt 16 and the second shoulder belt 18 may be anchored to the back side of the seat back 12. For anchoring of the first lap belt 20 and the second lap belt 22, a pair of seat belt retractors 34 and 36 is provided. As is known in the art, the seat belt retractors 34 and 36 may be anchored to the seat base 14 or may be anchored to a location on the vehicle floor or to an adjacent pillar.

The seat belt retractor 34 is of a conventional type. Conversely, the seat belt retractor 36 may be selectively locked between a retracted position and a non-retracted position as will be discussed below. It is possible that either or both seat belt retractors 34 and 36 may be of the lockable variety. However, for purposes of discussion only one of the seat belt retractors, that is, seat belt retractor 36, is of the lockable type.

As an alternative to the use of two retractors 34 and 36 to which the lap belts 20 and 22 are attached it is possible to use a single retractor 37 as illustrated in FIG. 1B. According to this configuration the retractor 37 would include a lockable element to lock one or the other or both of the lap belts 20 and 22.

As noted, the vehicle seat 10 of the disclosed invention includes a first shoulder belt 16 and a second shoulder belt 18. To regulate the positions of the first shoulder belt 16 and the second shoulder belt 18 with respect to the seat back 12 a first moveable shoulder belt guide 38 and a second moveable shoulder belt guide 40 are provided.

The first moveable shoulder belt guide 38 and the second moveable shoulder belt guide 40 operate in conjunction with the lockable retractor 36 to allow the seat occupant (not shown) to select between a 4-point arrangement and a 3-point arrangement. Particularly, the 4-point arrangement can be achieved when the first moveable shoulder belt guide 38 and the second moveable shoulder belt guide 40 are moved to their inboard positions as shown in FIGS. 1A and 1B (such that the first shoulder belt 16 and the second shoulder belt 18 are moved relatively close to the centerline of the vehicle seat 10) and the lockable seat belt retractor 36 is in its unlocked position (so as to allow the buckle assembly 24 to also be generally positioned toward or away from the centerline).

This arrangement is illustrated in FIGS. 1A and 1B in which the geometry of the 4-point belt system is established to allow the upper end of the first shoulder belt 16 and the upper end of the second shoulder belt 18 to extend over the seat back 12 on either side of the occupant's neck. In this way each of the first shoulder belt 16 and the second shoulder belt 18 are positioned on the mid-clavicle of the occupant thus allowing the lower ends of the first and second shoulder belts 16 and 20 to substantially meet at the point where the lap belt buckle 26 and the latch plate 28 are joined.

However, the geometry illustrated in FIGS. 1A and 1B for a 4-point arrangement would not be appropriate for a conventional 3-point arrangement because one of the shoulder belts 16 or 18 would cross over the centerline of the body as it connects to a lap belt buckle on the outboard edge of the seat base 14 and would likely engage the neck of the seated occupant (not shown) potentially affecting comfort and performance. Accordingly, the vehicle seat 10 of the disclosed invention is configured so as to allow the occupant to select between a 4-point seat belt arrangement as illustrated in FIGS. 1A and 1B and a 3-point seat belt arrangement as illustrated in FIG. 2 which is a front view of the vehicle seat 10. A perspective view of the vehicle seat 10 of the disclosed invention in its 3-point arrangement is illustrated in FIG. 3 in which the lockable retractor 36 is more clearly illustrated. As shown in FIG. 3 the lockable retractor 36 is attached to the vehicle floor by a retractor bracket 42. As noted above the retractor 36 may alternatively be attached to the vehicle seat base 14 or may be attached to an adjacent interior structure such as a pillar (not shown).

Figure 3A:
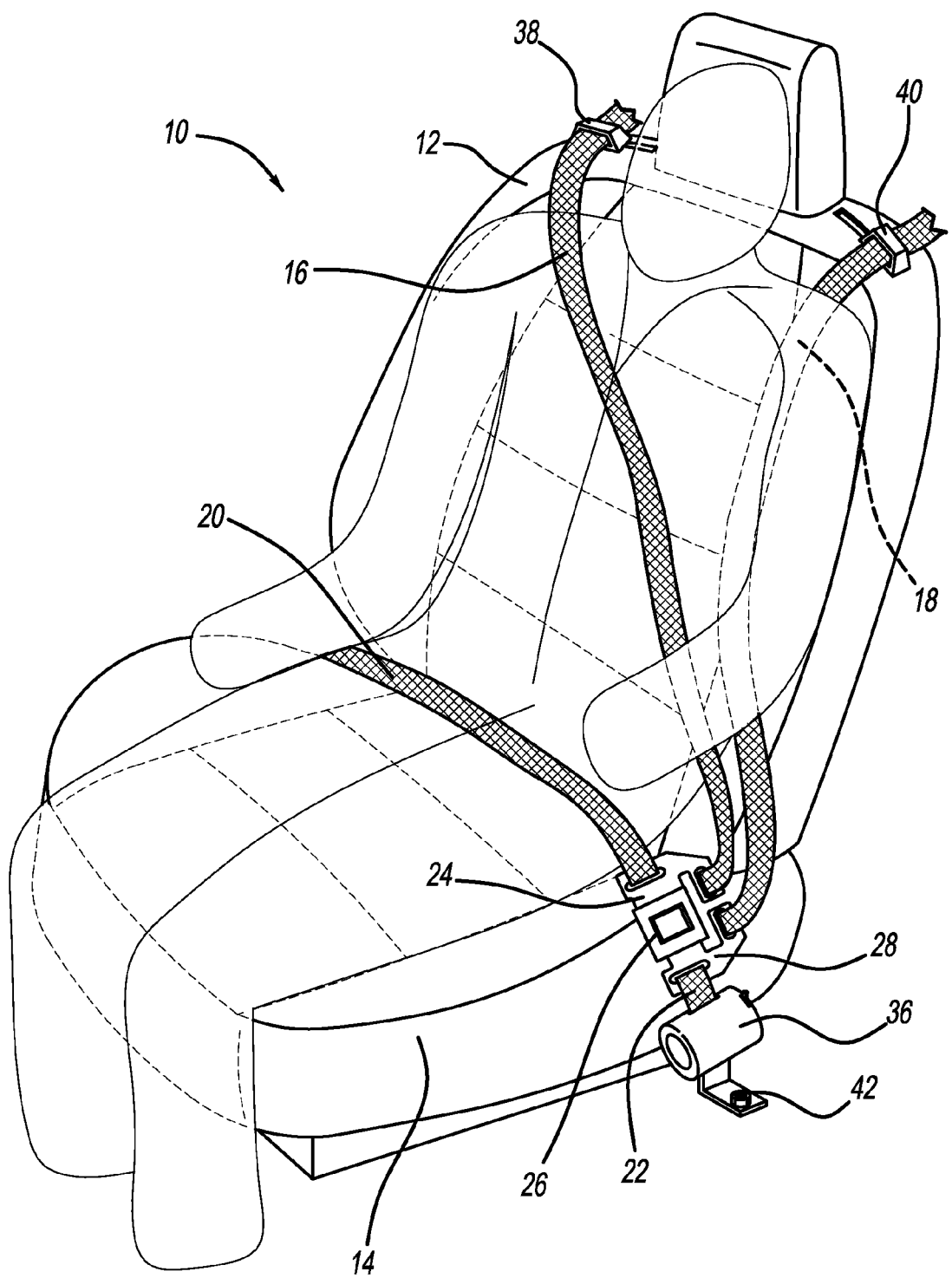

As shown in FIGS. 2, 3 and 3A, the vehicle seat 10 has been configured for a 3-point seat belt arrangement. Particularly, the first moveable shoulder belt guide 38 and the second moveable shoulder belt guide 40 have been moved outward and away from the centerline of the vehicle seat 10. With the shoulder belt guides 38 and 40 so positioned the first shoulder belt 16 and the second shoulder belt 18 are also moved outward away from the centerline of the vehicle seat 10. Thus positioned the upper end of the shoulder belt 16 crosses the occupant's chest as shown in FIG. 3A without interacting with the occupant's neck. In addition, the lockable seat belt retractor 36 has been moved to its locked position in which extraction of the second lap belt 22 from the lockable retractor 36 is limited thus positioning the buckle assembly 24 in the illustrated position to one side of the centerline of the vehicle seat 10 closer to the retractor 36 than to the retractor 34. When in the illustrated 3-point seat belt arrangement the second shoulder belt 18 is not used as illustrated in FIG. 3A.

By fixing the buckle assembly 24 to one side of the seat base 14 and thus particularly positioning the latchplate 28 at the outboard edge of the seat base 14, a belt geometry is provided that counteracts submarining, a movement defined as occupant motion or kinematics in which the occupant's pelvis slides under the lap belts 20 and 22 and the abdomen loads the belts 20 and 22 instead of the pelvis loading the belt. The method of fixing the mobility of the second lap belt 22 could be tied to the motion of the movable guides 38 and 40 described above. It could entail a mechanical, electrical, or other type of switch such that when the movable guides 38 and 40 are moved, the second lap belt 22 is automatically retracted into the lockable retractor 36 as far as physically possible, and then is locked in place to correspond to the new belt geometry.

As noted, the lockable retractor 36 provides a means to alter the mobility of the latch plate 28 to keep it fixed to one side of the seat base 14. Specifically, the lockable retractor 36 may be moved between an unlocked position in which the second lap belt 22 may be extracted therefrom and positioned in the 4-point seat belt configuration as shown in FIG. 1 and a locked position in which extraction of the second lap belt 22 is restricted as noted above, thus resulting in the lap belts 20 and 22 being positioned in the 3-point arrangement as shown in FIGS. 2 and 3.

The locking and unlocking of the lockable retractor 36 may be accomplished in a variety of ways. One such approach is illustrated in FIG. 4 which is a close-up view of the lockable retractor 36 shown in partial sectional view. According to this suggested arrangement, the lockable retractor 36 includes a spool 44 to which the second lap belt 22 is anchored and upon which at least a portion of the second lap belt 22 may be wound. The lockable retractor 36 also includes a ratchet 46 attached to one end of the spool 44. A lever-operated lock 48 is pivotably attached to the lockable retractor 36. The pawl of the lever-operated lock 48 may be moved between an unlocked position in which the mobility of the second lap belt 22 is unrestricted to achieve the 4-point seat belt arrangement shown in FIG. 1 and a locked position in which the mobility of the second lap belt 22 is limited to achieve the 3-point seat belt arrangement shown in FIGS. 2 and 3.

While the vehicle seat 10 has been described as set forth above certain variations and modifications may be made without varying the scope of the disclosed invention. For example, the first shoulder belt 16 may be equipped with a first shoulder belt retractor 50 having a switchable load limiter and the second shoulder belt 18 may be equipped with a second shoulder belt retractor 52 having a switchable load limiter. The shoulder belt retractors 50 and 52 are illustrated in broken lines in FIGS. 1 and 2. The shapes and positions of the shoulder belt retractors 50 and 52 are suggestive and not intended as being limiting.

The switchable load limiting characteristics of the shoulder belt retractors 50 and 52 compensate for the fact that the load-limit on each of the shoulder belts 16 and 18 when operating in a 4-point belt arrangement is approximately V2 the load limit of the single shoulder belt 16 when operating in a 3-point belt system. The total load on the occupant's chest remains the same, but the load on each shoulder is different. Accordingly, if an occupant wears a 3-point belt with a load-limit that is tuned to a 4-point belt they may experience excessive upper torso excursion and could contact interior components in the vehicle or they could contact other occupants. Therefore, the shoulder belt retractors 50 and 52 can change the load limit to make it appropriate to the belt geometry desired by the occupant. The actual switching of the switchable load limitation of the shoulder belt retractors 50 and 52 could be tied to the motion of the movable guides 38 and 40. The switching of the load limitations of the shoulder belt retractors 50 and 52 could entail a mechanical, electrical or other type of switch such that when the movable guides 38 and 40 are moved, the load limit in the shoulder belt retractor is automatically adjusted to correspond to the new belt geometry The vehicle seat 10 may also include an arrangement for automatically moving the first moveable shoulder belt guide 38 and the second moveable shoulder belt guide 40 between their inboard positions (when the 4-point seat belt arrangement is selected by the occupant) and their outboard positions (when the 3-point seat belt arrangement is alternatively selected). Similarly the shoulder belt retractors 50 and 52 may be adjustably movable between inboard and outboard positions consistent with the movement of the shoulder belt guides 38 and 40. The lockable retractor 36 may also be automated thus allowing automatic selection between the unlocked position for use in the 4-point seat belt arrangement and the locked position for use in the 3-point seat belt arrangement as discussed above. Furthermore, activation of some or all of the moveable components of the vehicle seat 10 could be done by a single button or multiple buttons located on the seat, instrument panel, console, or other location, or it could all be accomplished by sliding or otherwise moving a the moveable shoulder belt guides 38 and 40 into the 3-point or 4-point position, or by some other means. The ability to change from a 4-point belt to a 3-point belt should help improve customer acceptance and should address any concerns of pregnant customers.

As noted above, while FIGS. 1A, 1B, 2 and 3 relate to the first embodiment of the disclosed invention. FIGS. 5 and 6 relate to the second embodiment of the disclosed invention. With respect thereto, a vehicle seat arrangement, generally illustrated as 60 and having the reversible 3-point to 4-point seat belt system of the disclosed invention is illustrated. The vehicle seat arrangement 60 includes a seat back 62 and a seat base 64. As is the case with the illustrated vehicle seat 10 and seat back 12 above, the configuration of the vehicle seat arrangement 60, the seat back 62 and the seat base 64 are for illustrative purposes only and are not intended as being limiting.

The vehicle seat arrangement 60 is shown in FIG. 5 in its 4-point configuration. Like the vehicle seat 10, the vehicle seat arrangement 60 provides 4-point seat belts and allows alteration of the belt geometry, lap belt mobility, and shoulder belt load limits. The 4-point belt system includes a first shoulder belt 66, a second shoulder belt 68, a first lap belt 70, and a second lap belt 72.

A buckle assembly 74 including a lap belt buckle 75 and a latch plate 76 is provided. The first shoulder belt 66 and the first lap belt 70 are attached to the lap belt buckle 75. The second shoulder belt 68 and the second lap belt 72 are attached to the latchplate 28.

The first lap belt 70 is also attached to a lap belt retractor 78. The second lap belt 72 is attached to a lap belt retractor 80. The seat belt retractors 78 and 80 may be anchored to a location on the vehicle seat, the vehicle floor or to an adjacent pillar as is known in the art. The lap belt retractor 78 is of a conventional type whereas the lap belt retractor 80 may be selectively locked between the retracted position and a non-retracted position as discussed above with respect to the first embodiment of the disclosed invention shown in FIGS. 1A through 3. While the lap belt retractor 80 has been described as being of the lockable type, it is possible that either or both lap belt retractors 78 and 80 may be of the lockable variety.

The vehicle seat arrangement 60 according to the second embodiment of the disclosed invention includes an arrangement for attaching the first shoulder belt 66 and the second shoulder belt 68 to the vehicle body structure as opposed to attachment to the seat back as is the case for the first embodiment of the disclosed invention discussed above with respect to FIGS. 1 through 3. Specifically, the first ends of the first shoulder belt 66 and the second shoulder belt 68 are attached to a structure 82 instead of the vehicle seat back. The structure 82 may be one of any of vehicle several body structures known to those skilled in the art.

To regulate the positions of the first shoulder belt 66 and the second shoulder belt 68 with respect to the centerline of the seat back 62 a first moveable shoulder belt guide 84 and a second moveable shoulder belt guide 86 are provided. Also provided are a first retractor 88 and a second retractor 90 (both retractors 88 and 90 shown in broken lines). Some or all of the moveable shoulder belt guides 84 and 86 and the retractors 88 and 90 may be fitted with load limiters as described above with respect to the first embodiment of the disclosed invention.

A first motor 92 is provided to selectively move the first moveable shoulder belt guide 84 and its associated first retractor 88. A second motor 94 is provided to selectively move the second moveable shoulder belt guide 86 and its associated first retractor 90. The motors 92 and 94 are non-limiting examples of means for providing necessary movement, which may or may not be linear, and other methods of providing the necessary motion may be adopted.

As is the case with the first embodiment of the disclosed invention described above with respect to FIGS. 1A through 3, the first moveable shoulder belt guide 84, operating with or without the first retractor 88, and the second moveable shoulder belt guide 86, operating with or without the second retractor 90, operate in conjunction with the lockable lap belt retractor 80 (with the lap belt retractor 78 being unlocked) to allow the seat occupant (not shown) to select between a 4-point arrangement and a 3-point arrangement. The 4-point arrangement can be achieved when the first moveable shoulder belt guide 84 and the second moveable shoulder belt guide 86 are moved to their inboard positions as shown in FIG. 5 by their motors 92 and 94 respectively. In this way the first shoulder belt 66 and the second shoulder belt 68 are moved relatively close to the centerline of the vehicle seat back 62. Thus arranged the upper end of the first shoulder belt 66 and the upper end of the second shoulder belt 68 extend over the seat back 62 on either side of the occupant's neck thus positioning each of the first shoulder belt 66 and the second shoulder belt 68 on the mid-clavicle of the occupant and allowing the lower ends of the first and second shoulder belts 66 and 68 to substantially meet as the lap belt buckle 75 and the latchplate 76 are joined.

The vehicle seat arrangement 60 of the disclosed invention is configured so as to allow the occupant to select between a 4-point seat belt arrangement as illustrated in FIG. 5 and a 3-point seat belt arrangement as illustrated in FIG. 6. As shown in FIG. 6, the vehicle seat arrangement 60 has been configured for a 3-point seat belt arrangement. Particularly, the first moveable shoulder belt guide 84 and the second moveable shoulder belt guide 86, and, optionally, their associated retractors 88 and 90, have been moved outward and away from the centerline of the vehicle seat back 62. With the shoulder belt guides 84 and 86, and, optionally, their associated retractors 88 and 90, so positioned the first shoulder belt 66 and the second shoulder belt 68 are also moved outward away from the centerline of the vehicle seat back 62. Thus, and as is the case shown above with respect to FIG. 3A, when an occupant is seated the upper end of the shoulder belt 66 crosses the occupant's chest without interacting with the occupant's neck. In addition, the lockable seat belt retractor 80 has been moved to its locked position in which extraction of the second lap belt 72 from the lockable lap belt retractor 80 is limited thus positioning the buckle assembly 74 in the illustrated position to one side of the centerline of the vehicle seat back 62 closer to the lap belt retractor 80 than to the lap belt retractor 78.

The method of fixing the mobility of the second lap belt 72 could be tied to the motion of the motors 92 and 94 that respectively drive the movable guide 84 (and its associated retractor 88) and the movable guide 86 (and its associated retractor 90). It could entail a mechanical, electrical, or other type of switch such that when the movable guides 84 and 86 and their associated retractors 88 and 90 are moved, the second lap belt 72 is automatically retracted into the lockable lap belt retractor 80 as far as physically possible, and then is locked in place to correspond to the new belt geometry. This arrangement has the benefit of counteracting submarining as described above with respect to the first embodiment of the disclosed invention.

As set forth above with respect to the first embodiment, the vehicle seat arrangement 60 may be configured so as to automatically move the first moveable shoulder belt guide 84 and its associated retractor 88 and the second moveable shoulder belt guide 86 and its associated retractor 90 between their inboard positions (when the 4-point seat belt arrangement is selected by the occupant) and their outboard positions (when the 3-point seat belt arrangement is alternatively selected). The lockable lap belt retractor 80 may also be automated thus allowing automatic selection between the unlocked position for use in the 4-point seat belt arrangement and the locked position for use in the 3-point seat belt arrangement as discussed above. Furthermore, activation of some or all of the moveable components of the vehicle seat arrangement 60 could be done by a single button or multiple buttons located on the seat, instrument panel, console, or other location, or it could all be accomplished by manually sliding or otherwise moving a the moveable shoulder belt guides 84 and 86 into the 3-point or 4-point position, or by some other means. The ability to change from a 4-point belt to a 3-point belt should help improve customer acceptance and should address any concerns of pregnant customers.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A seat and seat belt arrangement for a vehicle comprising:
    a seat having a centerline, a seat back and a seat base;
    a pair of shoulder belts;
    a reversibly switchable load limiter associated with said pair of shoulder belts;
    a pair of lap belts;
    an attachment assembly to which said shoulder belts and said lap belts are attached; and
    a retractor to which one of said lap belts is attached, said retractor being selectively movable between a retracted position in which said attachment assembly is to one side of said centerline in a 3-point arrangement for use by a seat occupant and a non-retracted position in which said attachment assembly is generally moveable with respect to said centerline in a 4-point arrangement for use by a seat occupant, said reversibly switchable load limiter being switchable from a first load limit when in said 4-point arrangement to a second load limit when in said 3-point arrangement, said first load limit being less than said second load limit.

2. The seat and seat belt arrangement of claim 1 wherein said retractor includes a lock for locking said retractor in said retracted position.

3. The seat and seat belt arrangement of claim 2 wherein said lock comprises a latch and a ratchet.

4. The seat and seat belt arrangement of claim 1 wherein said seat back has an upper portion and wherein said arrangement further includes a movable shoulder belt guide operatively associated with said upper portion of said seat back.

5. The seat and seat belt arrangement of claim 1 in which said pair of shoulder belts comprises a first shoulder belt having a first end and a second end and a second shoulder belt having a first end and a second end and in which said pair of lap belts comprises a first lap belt having a first end and a second end and a second lap belt having a first end and a second end.

6. The seat and seat belt arrangement of claim 1 wherein said attachment assembly includes a lap belt buckle to which one of said lap belts and one of said shoulder belts is attached and a mating attachment assembly to which the other of said lap belts and the other of said shoulder belts is attached.

7. The seat and seat belt arrangement of claim 6 wherein said lap belt buckle is releasably attachable to said mating attachment assembly.

8. A seat and seat belt arrangement for a vehicle comprising:
    a seat having a centerline, a seat back and a seat base;
    a first shoulder belt having a first end and a second end, said first end being operatively associated with said seat back;
    a second shoulder belt having a first end and a second end, said first end being operatively associated with said seat back;
    a first lap belt having a first end and a second end;
    a second lap belt having a first end and a second end;
    a first retractor, said first end of said first lap belt being attached to said first retractor;
    a second retractor, said first end of said second lap belt being attached to said second retractor; and
    an attachment assembly to which said second ends of said belts are attached, whereby said first retractor is selectively movable between a retracted position in which said attachment assembly is to one side of said centerline in a 3-point arrangement for use by a seat occupant and a non-retracted position in which said attachment assembly is generally moveable with respect to said centerline in a 4-point arrangement for use by a seat occupant, said reversibly switchable load limiter being switchable from a first load limit when in said 4-point arrangement to a second load limit when in said 3-point arrangement, said first load limit being less than said second load limit.

9. The seat and seat belt arrangement of claim 8 wherein said first retractor includes a lock for locking said first retractor in said retracted position.

10. The seat and seat belt arrangement of claim 9 wherein said lock comprises a latch and a ratchet.

11. The seat and seat belt arrangement of claim 8 further including a movable shoulder belt guide operatively associated with an upper portion of said seat back.

12. The seat and seat belt arrangement of claim 8 wherein said attachment assembly includes a lap belt buckle to which one of said lap belts and one of said shoulder belts is attached and a mating attachment assembly to which the other of said lap belts and the other of said shoulder belts is attached.

13. The seat and seat belt arrangement of claim 12 wherein said lap belt buckle is releasably attachable to said mating attachment assembly.

14. A seat belt and buckle system for a vehicle seat that is selectively movable between a 3-point arrangement and a 4-point arrangement, the system comprising:
- a pair of shoulder belts;
- a reversibly switchable load limiter associated with said shoulder belts;
- a pair of moveable shoulder belt anchoring assemblies attached to the vehicle seat, said anchoring assemblies being selectively movable toward one another and away from one another;
- a pair of lap belts;
- an attachment assembly to which said shoulder belts and said lap belts are attached; and
- a retractor to which one of said lap belts is attached, said retractor being selectively movable between a retracted position in which said attachment assembly is to one side of said centerline in the 3-point arrangement for use by a seat occupant and a non-retracted position in which said attachment assembly is generally moveable with respect to said centerline in the 4-point arrangement for use by a seat occupant, wherein said anchoring assemblies are moved toward one another for said 4-point arrangement and away from one another for said 3-point arrangement, said reversibly switchable load limiter being switchable from a first load limit when in said 4-point arrangement to a second load limit when in said 3-point arrangement, said first load limit being less than said second load limit.

* * * * *